United States Patent
Morita

(10) Patent No.: US 10,026,392 B2
(45) Date of Patent: Jul. 17, 2018

(54) ACOUSTIC LENS, METHOD FOR PRODUCING THE SAME, ULTRASONIC PROBE, AND ULTRASONIC IMAGING DEVICE

(71) Applicant: Konica Minolta, Inc., Tokyo (JP)

(72) Inventor: Kiyokazu Morita, Kokubunji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/582,936

(22) Filed: May 1, 2017

(65) Prior Publication Data
US 2017/0335108 A1    Nov. 23, 2017

(30) Foreign Application Priority Data
May 20, 2016    (JP) ................................. 2016-101450

(51) Int. Cl.

| | |
|---|---|
| *G10K 11/30* | (2006.01) |
| *C08L 83/04* | (2006.01) |
| *B29B 7/00* | (2006.01) |
| *B29C 35/02* | (2006.01) |
| *B29B 7/74* | (2006.01) |
| *B29B 7/90* | (2006.01) |
| *B29K 83/00* | (2006.01) |
| *B29B 7/10* | (2006.01) |

(52) U.S. Cl.
CPC .............. *G10K 11/30* (2013.01); *B29B 7/002* (2013.01); *B29B 7/7495* (2013.01); *B29B 7/90* (2013.01); *B29C 35/02* (2013.01); *C08L 83/04* (2013.01); *B29B 7/103* (2013.01); *B29K 2083/00* (2013.01); *B29K 2995/0001* (2013.01); *C08L 2203/02* (2013.01); *C08L 2205/025* (2013.01)

(58) Field of Classification Search
USPC .................................................. 525/477–479
See application file for complete search history.

(56) References Cited

U.S. PATENT DOCUMENTS

| | | | |
|---|---|---|---|
| 4,774,281 A * | 9/1988 | Chaffee | C08L 83/04 524/588 |
| 2017/0000455 A1 * | 1/2017 | Nakai | A61B 8/4281 |
| 2017/0252465 A1 * | 9/2017 | Nagai | A61K 49/22 |

FOREIGN PATENT DOCUMENTS

| | | |
|---|---|---|
| JP | H01-34396 B2 | 7/1989 |
| JP | H08-000615 A | 1/1996 |

OTHER PUBLICATIONS

Silicones: An Introduction to Their Chemistry and Applications, Chapel River Press (1962) p. 27.*
"Low-attenuation Acoustic Silicone Lens for Medical Ultrasonic Array Probes" authored by Yamashita et al. and published in Piezoelectric and Acoustic Materials (2008) © Springer Science + Business Media.*

* cited by examiner

*Primary Examiner* — Marc S Zimmer
(74) *Attorney, Agent, or Firm* — Lucas & Mercanti, LLP

(57) ABSTRACT

An acoustic lens for an ultrasonic probe includes a vulcanization-molded article of a rubber composition including a first silicone rubber composition having a plasticity number of 100 or less, and a second silicone rubber composition having a plasticity number of 150 or more and 300 or less.

9 Claims, 2 Drawing Sheets

ACOUSTIC LENS, METHOD FOR PRODUCING THE SAME, ULTRASONIC PROBE, AND ULTRASONIC IMAGING DEVICE

The entire disclosure of Japanese Patent Application No. 2016-101450 filed on May 20, 2016 including description, claims, drawings, and abstract are incorporated herein by reference in its entirety.

BACKGROUND OF THE INVENTION

Field of the Invention

The present invention relates to an acoustic lens, a method for producing the acoustic lens, and an ultrasonic probe and an ultrasonic imaging device having the acoustic lens.

Description of the Related Art

An ultrasonic imaging device for conducting an examination using ultrasonic waves is configured to send ultrasonic waves to the inside of a subject (for example, a living body), receive the ultrasonic wave reflected in the subject, and form an ultrasonic image including information in the subject. By this way, the inside of the subject can be examined by visualizing the inside by the ultrasonic imaging device.

In an ultrasonic imaging device, an acoustic lens for an ultrasonic probe is used in the state that the acoustic lens is tightly attached to a subject. In view of decreasing the reflection of ultrasonic waves by a subject to thereby suppress attenuation of the ultrasonic wave, it is preferable that the acoustic lens has an acoustic impedance that is close to the acoustic impedance of the subject.

As an example of the acoustic lens, an acoustic lens formed of a mixture of a silicone-based rubber and a butadiene-based rubber is known (for example, see JP 8-000615 A). Furthermore, as another example of the acoustic lens, an acoustic lens formed of a silicone rubber in which titanium oxide particles are incorporated is known (for example, see JP 1-034396 B).

However, in the acoustic lenses described in JP 8-000615 A and JP 1-034396 B, physical strength may be decreased, and thus tearing, abrasion and the like due to use may occur. An acoustic lens is generally used together with chemicals such as an antiseptic solution and a jelly, whereas the chemical stability against chemicals is low in the acoustic lenses described in JP 8-000615 A and JP 1-034396 B, and thus decrease in sensitivity due to attenuation of ultrasonic waves and discoloration may occur due to use over a long period.

SUMMARY OF THE INVENTION

The present invention has been made in view of such a point, and a first object thereof is to provide an acoustic lens that suppresses attenuation of ultrasonic waves and is also excellent in chemical stability and physical strength. Furthermore, a second object of the present invention is to provide an ultrasonic probe and an ultrasonic imaging device having high sensitivity against ultrasonic waves over a long period.

To achieve at least one of the abovementioned objects, according to an aspect, an acoustic lens for an ultrasonic probe, reflecting one aspect of the present invention comprises a vulcanization-molded article of a rubber composition including a first silicone rubber composition having a plasticity number of 100 or less, and a second silicone rubber composition having a plasticity number of 150 or more and 300 or less.

To achieve at least one of the abovementioned objects, according to an aspect, an ultrasonic probe reflecting one aspect of the present invention comprises the acoustic lens according to the aspect of the present invention.

To achieve at least one of the abovementioned objects, according to an aspect, an ultrasonic imaging device reflecting one aspect of the present invention comprises the ultrasonic probe according to the aspect of the present invention.

To achieve at least one of the abovementioned objects, according to an aspect, a method for producing an acoustic lens for an ultrasonic probe, reflecting one aspect of the present invention comprises the steps of: preparing a rubber composition by kneading a first silicone rubber composition having a plasticity number of 100 or less and a second silicone rubber composition having a plasticity number of 150 or more and 300 or less; and subjecting the rubber composition to vulcanization molding.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an ultrasonic imaging device according to an embodiment of the present invention will be described in detail with reference to the drawings. However, the scope of the invention is not limited to the illustrated examples.

[Ultrasonic Imaging Device]

Figure 1A:
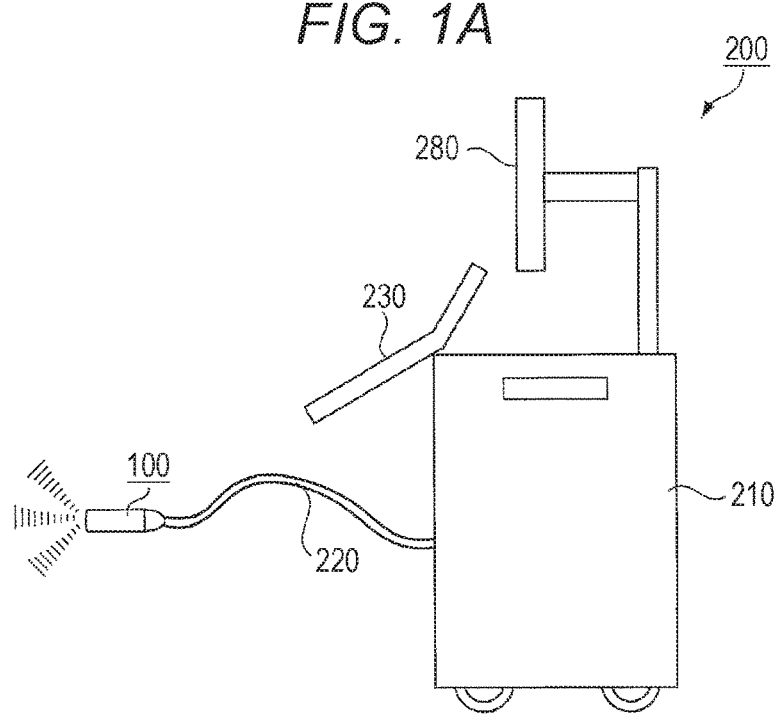
FIG. 1A is a schematic view showing an example of the constitution of an ultrasonic imaging device according to an embodiment of the present invention.
Figure 1B:
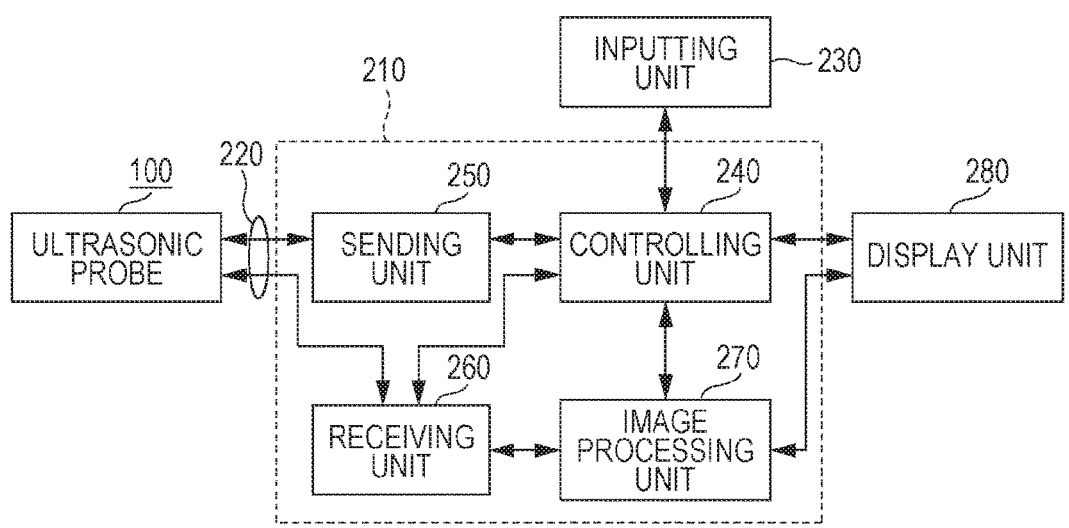
FIG. 1B is a block diagram showing an example of the electric constitution of the ultrasonic imaging device according to an embodiment of the present invention.

FIG. 1A is a schematic view showing an example of the constitution of an ultrasonic imaging device 200 according to the present embodiment, and FIG. 1B is a block diagram showing an example of the electric constitution of the ultrasonic imaging device 200.

As shown in FIG. 1A, the ultrasonic imaging device 200 has a device main body 210, an ultrasonic probe 100 that is connected to the device main body 210 via a cable 220, and an inputting unit 230 and a display unit 280 disposed on the device main body 210. The details of the ultrasonic probe 100 will be mentioned below.

As shown in FIG. 1B, the device main body 210 has a controlling unit 240 that is connected to the inputting unit 230, a sending unit 250 and a receiving unit 260 that are connected to the controlling unit 240 and the cable 220, and an image processing unit 270 that is connected to each of the receiving unit 260 and the controlling unit 240. The controlling unit 240 and the image processing unit 270 are each connected to the display unit 280.

The cable 220 connects the ultrasonic probe 100 and the sending unit 250, and the ultrasonic probe 100 and the receiving unit 260, respectively, and transmits a signal.

The inputting unit 230 is a device for inputting, for example, a command to give an instruction to initiate a diagnosis, and the like, or data of a subject such as personal information, and examples include an operation panel, and a key board and the like including a plurality of input switches.

The controlling unit 240 includes, for example, a microprocessor and a memory element, and periphery circuits thereof, and the like. The controlling unit 240 is a circuit that is configured to control the entirety of the ultrasonic imaging device 200 by controlling the ultrasonic probe 100, the inputting unit 230, the sending unit 250, the receiving unit 260, the image processing unit 270 and the display unit 280, depending on the respective functions thereof.

The sending unit 250 sends a signal from the controlling unit 240 to the ultrasonic probe 100, for example, via the cable 220.

The receiving unit 260 receives the signal from the ultrasonic probe 100, for example, via the cable 220, and outputs the signal to the controlling unit 240 or the image processing unit 270.

The image processing unit 270 is a circuit that is configured to generate an image (ultrasonic image) that represents the state of the inside of the subject, for example, according to the control by the controlling unit 240, based on the signal that has been received by the receiving unit 260. For example, the image processing unit 270 has a Digital Signal Processor (DSP) that is configured to generate an ultrasonic image of the subject, and a digital-analog conversion circuit (DAC circuit) that is configured to convert the signal that has been processed in the DSP from a digital signal to an analog signal, and the like.

The display unit 280 is a device for displaying the ultrasonic image of the subject generated in the image processing unit 270, for example, according to the control of the controlling unit 240. The display unit 280 is, for example, a display device such as a CRT display, a liquid crystal display (LCD), an organic EL display or a plasma display, or a printing device such as a printer.

[Ultrasonic Probe]

Figure 2:
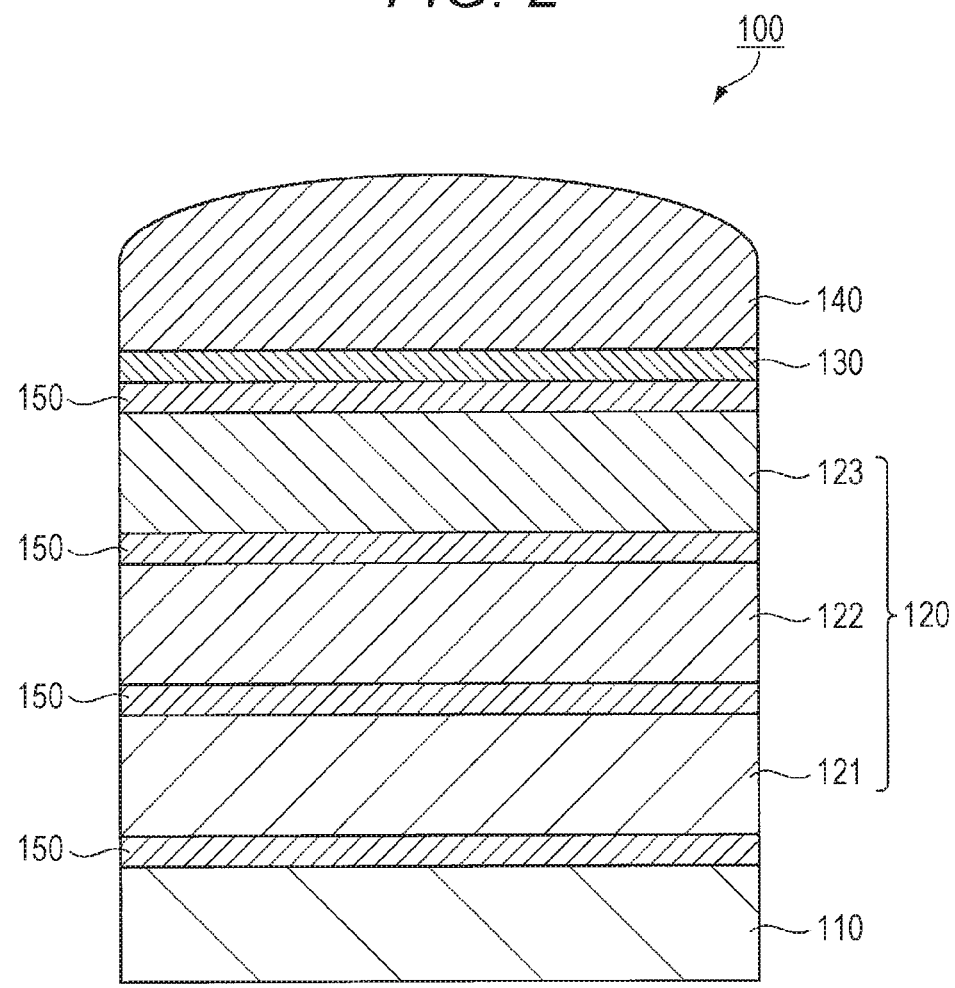
FIG. 2 is a cross-sectional schematic view showing an example of the constitution of an ultrasonic probe according to an embodiment of the present invention.

Secondly, the ultrasonic probe 100 of the present embodiment will be explained. FIG. 2 is a cross-sectional schematic view showing an example of the constitution of the ultrasonic probe 100 of the present embodiment.

The ultrasonic probe 100 of the present embodiment has a backing layer 110, a piezoelectric element 120 disposed on the backing layer 110, an acoustic matching layer 130 disposed on the piezoelectric element 120, and an acoustic lens 140 according to the present embodiment disposed on the acoustic matching layer 130. The ultrasonic probe 100 can be constituted in a similar manner to that of a known ultrasonic probe except for the acoustic lens 140.

The piezoelectric element 120 has a sending piezoelectric body 121 disposed on a backing layer 110, and an intermediate layer 122 disposed on the sending piezoelectric body 121, and a receiving piezoelectric body 123 disposed on the intermediate layer 122. Furthermore, electrodes 150 are respectively disposed on both surfaces of the sending piezoelectric body 121 and both surfaces of the receiving piezoelectric body 123. Furthermore, an electrode may be attached to the piezoelectric element 120 by means of a flexible printed substrate (FPC), which is not illustrated. By this way, optional beam forming is enabled by the sending-receiving driving of ultrasonic waves, which is controlled by an ultrasonic imaging device to which the ultrasonic probe 100 is connected.

(Backing Layer)

The backing layer 110 is an ultrasonic absorber for supporting the piezoelectric element 120 and absorbing unnecessary ultrasonic waves.

Examples of the material of the backing layer 110 include, natural rubbers, ferrite rubbers, epoxy resins, thermoplastic resins, and resin-based composite materials obtained by press-molding a mixture of at least any of these materials and a powder of tungsten oxide, titanium oxide, ferrite or the like.

Examples of the kinds of the thermoplastic resins include vinyl chlorides, polyvinyl butyrals, ABS resins, polyurethanes, polyvinyl alcohols, polyethylenes, polypropylenes, polyacetals, polyethylene telephthalates, fluorine resins, polyethylene glycols and polyethylene telephthalate-polyethylene glycol copolymers. As the material for the backing layer 110, a resin-based composite material is preferable, and a rubber-based composite material or an epoxy resin-based composite material is more preferable. The shape of the backing layer 110 can be suitably designed depending on the shape of the piezoelectric element 120 or the shape of the ultrasonic probe 100.

It is preferable that the rubber-based composite material contains a rubber component and a filler, which will be mentioned below. Furthermore, other compounding agents may be added to the rubber-based composite material as necessary.

Examples of the rubber component include ethylene-propylene rubbers, hydrogenated nitrile rubbers, chloroprene rubbers, silicone rubbers, blend rubbers of an ethylene-propylene rubber and a hydrogenated nitrile rubber, blend rubbers of an ethylene-propylene rubber and a nitrile rubber, blend rubbers of a nitrile rubber and/or a hydrogenated nitrile rubber and a high-styrene rubber, and blend rubbers of an ethylene-propylene rubber and a high-styrene rubber. The kind of the rubber component may be one or more kind(s).

Furthermore, in the case when the hardness of the rubber component is measured by a spring hardness (durometer hardness) tester based on JIS K6253 (ISO 7619-1), it is preferable that the rubber component has a hardness of A70 or more when a type A durometer is used, and has a hardness of D70 or less when a type D durometer is used.

The kind and content of the filler added to the rubber-based composite material are not specifically limited. Examples of the kind of the filler include metal oxides such as zinc oxide, titanium white, red iron oxide, ferrite, alumina, tungsten trioxide and ytterbium oxide; clays such as calcium carbonate, hard clay and diatomite; metal salts such as calcium carbonate and barium sulfate; metal-based micropowders such as tungsten and molybdenum; balloons such as glass balloon and polymer balloons; and glass powders. These fillers may be added at various ratios, and the ratio is preferably 50 parts by mass or more and 3,000 parts by mass or less, more preferably 100 parts by mass or more and 2,000 parts by mass or less, further preferably 300 parts by mass or more and 1,500 parts by mass or less with respect to 100 parts by mass of the rubber component. Furthermore, the kind of the filler may be one or more kind(s).

Examples of other compounding agents include vulcanizing agents, crosslinking agents, curing agents and auxiliary agents therefor, deterioration inhibitors, antioxidants, and colorants. Examples of the kind of the vulcanizing agents include carbon black, silicon dioxide, process oils and sulfur. Examples of the kind of the crosslinking agents include dicumylperoxide (DI-CUP; manufactured by Hercules, "DI-CUP" is a registered trademark of this company). Examples of the kind of the antioxidants include stearic acid. The addition amount of the compounding agent may be suitably preset depending on the property of the acoustic lens 140. The addition amount of each compounding agent is, for example, 1 part by mass or more and 100 parts by mass or less with respect to 100 parts by mass of the rubber component.

It is preferable that the epoxy resin-based composite material includes an epoxy resin component and a filler, which will be mentioned below. Furthermore, other compounding agent may be added to the epoxy resin-based composite material as necessary.

Examples of the epoxy resin component include bisphenol A type epoxy resins, bisphenol F type epoxy resins, novolak type epoxy resins such as a resol-novolak type and a phenol-modified novolak type, and the like; polycyclic aromatic epoxy resins such as naphthalene structure-containing type, anthracene structure-containing type and fluorene structure-containing type epoxy resins; hydrogenated alicyclic epoxy resins; and liquid crystal epoxy resins. The kind of the epoxy resin component may be one or more kind(s).

Examples of the kinds of the fillers added to the epoxy resin-based composite material are similar to the kinds of the fillers added to the rubber-based composite material mentioned above. Furthermore, the epoxy resin component may also contain composite particles (for example, having a particle size of about 200 μm) prepared by pulverizing a rubber-based composite material. The composite particles are particles prepared by adding an additive (for example, ferrite, tungsten oxide) to a silicone rubber, and pulverizing the mixture by a pulverizer.

Furthermore, in the case when the epoxy resin-based composite material is used, it is necessary to further add a crosslinking agent. Examples of the kinds of the crosslinking agent include chain aliphatic polyamines such as diethylenetriamine, triethylenetetramine, dipropylenediamine and diethylaminopropylamine; cyclic aliphatic polyamines such as N-aminoethylpiperazine, menthenediamine and isophorone diamine and the like; aromatic amines such as m-xylenediamine, metaphenylenediamine, diaminodiphenylmethane and diaminodiphenylsulfone; secondary and tertiary amines such as polyamide resins, piperidine, N,N-dimethylpiperazine, triethylenediamine, 2,4,6-tris(dimethylaminomethyl)phenol, benzyldimethylamine and 2-(dimethylaminomethyl)phenol; imidazols such as 2-methylimidazole, 2-ethylimidazole and 1-cyanoethyl-2-undecylimidazolium trimellitate; and acid anhydrides such as liquid polymercaptane, polysulfide, phthalic acid anhydride, trimellitic anhydride, methyltetrahydrophthalic anhydride, methylendmethylenetetrahydrophthalic anhydride, methylbutenyltetrahydrophthalic anhydride and methylhexahydrophthalic acid.

The thickness of the backing layer 110 is preferably 1 mm or more and 10 mm or less, more preferably 1 mm or more and 5 mm or less.

(Piezoelectric Element)

The piezoelectric element 120 can convert an electric signal to mechanical oscillation, and can convert mechanical oscillation to an electric signal. By this way, the piezoelectric element 120 can send and receive ultrasonic waves. In addition, from the viewpoint of increasing the adhesiveness between the piezoelectric element 120 and the backing layer 110, it is preferable that at least a part of the piezoelectric element 120 is laminated on the backing layer 110 through an adhesive layer. Examples of the adhesive layer include silicone-based adhesives and epoxy-based adhesives.

As mentioned above, the piezoelectric element 120 has the sending piezoelectric body 121, the intermediate layer 122, the receiving piezoelectric body 123 and the electrodes 150. The electrodes 150 are disposed on both surfaces of the sending piezoelectric body 121 and both surfaces of the receiving piezoelectric body 123.

The sending piezoelectric body 121 is a piezoelectric body for sending ultrasonic waves toward a subject. The receiving piezoelectric body 123 is a piezoelectric body for receiving the ultrasonic wave from the subject. The material for constituting the sending piezoelectric body 121 and the material for constituting the receiving piezoelectric body 123 are suitably selected from known materials, and may be an inorganic substance, an organic substance or an inorganic-organic composite.

Examples of the material for the inorganic piezoelectric body include quartz, lithium niobate, barium titanate, lead titanate, zinc metaniobate, zinc oxide, $PbZrO_3/PbTiO_3$ solid solution (PZT), $Pb(Mg_{1/3}Nb_{2/3})O_3/PbTiO_3$ solid solution (PMN-PT) and $Pb(Zn_{1/3}Nb_{2/3})O_3/PbTiO_3$ solid solution (PZN-PT).

Examples of the material for the organic piezoelectric body include a polyvinylidene fluoride-ethylene trifluoride copolymer (P(VDF-3FE)), a kneaded product of P(VDF-3FE) and a polyurethane, a kneaded product of P(VDF-3FE) and a silicone, a kneaded product of a polyvinylidene fluoride and a nylon, a PVDF-based copolymer by copolymerization of vinylidene fluoride and chlorotrifluoroethylene, a polybutadiene-N,N-methylenebisacrylamide-styrene copolymer, a poly(γ-benzyl-L-glutamate), a polyurea resin by deposition addition polymerization of methanediisocyanate and diaminofluorene, a polyurea resin by deposition addition polymerization of xylylene diisocyanate and p-diaminobenzene, and an electret of a tetrafluoroethylene-hexafluoropropylene copolymer.

Furthermore, examples of the materials for the inorganic-organic composite include a PZT-siloxane-poly(meth)acrylate composite, and composites of polylactic acid and calcium phosphate or montmorillonite.

The thicknesses of the sending piezoelectric body 121 and the receiving piezoelectric body 123 are suitably adjusted within the scope in which the above-mentioned function can be exerted, and is, for example, 100 μm or more and 500 μm or less.

The intermediate layer 122 is disposed between the sending piezoelectric body 121 and the receiving piezoelectric body 123 in view of impedance matching. The intermediate layer 122 is, for example, a layer in which 1,200 parts by mass of ferrite is mixed with 100 parts by mass of an epoxy resin.

The electrodes 150 are formed on both surfaces of the sending piezoelectric body 121 and both surfaces of the receiving piezoelectric body 123, respectively. Examples of the material for the electrodes 150 include gold, platinum, silver, palladium, copper, aluminum, nickel, tin and alloys thereof. The method for forming the electrodes 150 on both surfaces of the sending piezoelectric body 121 and both surfaces of the receiving piezoelectric body 123 is suitably selected from known methods. Examples of the method for forming the electrodes 150 include a sputtering method and a vacuum deposition method. For example, it is preferable to form a first metal layer composed of titanium, chromium or the like at a thickness of 0.02 μm or more and 1.0 μm or less, then form a second metal layer composed of the above-mentioned material for the electrodes 150 at a thickness of 1 µm or more and 10 µm or less on the first metal layer. Alternatively, the electrodes 150 may also be formed by screen printing, a dipping process, a thermal spraying process or the like using an electroconductive paste obtained by mixing a micro metal powder and a low-melting point glass.

(Acoustic Matching Layer)

The acoustic matching layer 130 is a layer that is configured to match the acoustic impedance between the piezoelectric element 120 and the subject. For this purpose, the acoustic matching layer 130 has an acoustic impedance having a magnitude intermediate between the piezoelectric element 120 and the subject. The acoustic matching layer 130 may be a single layer or a laminate, and is preferably a laminate body consisting of plural layers having different acoustic impedances. For example, the acoustic matching layer 130 has preferably two or more layers, more preferably four or more layers. The thickness of the acoustic matching layer 130 is λ/4 when the wavelength of the ultrasonic wave is λ. In the case when this is not satisfied, it is possible that a desired acoustic property cannot be obtained.

The acoustic matching layer 130 can be constituted by, for example, various materials. It is preferable that the acoustic impedance of the acoustic matching layer 130 is preset so as to approach the acoustic impedance of the acoustic lens 140 in a stepwise or continuous manner toward the acoustic lens 140. For example, the acoustic impedance of the acoustic matching layer 130 can be adjusted by the kind and content of the additive added to the material.

Examples of the material of the acoustic matching layer 130 include aluminum, aluminum alloys (for example, an Al—Mg alloy), magnesium alloys, MACOR glass, glass, molten quartz, copper graphite and resins. Examples of the resins include polyethylenes, polypropylenes, polycarbonates, ABS resins, AAS resins, AES resins, nylons such as nylon 6 and nylon 66, polyphenylene oxide, polyphenylene sulfide, polyphenylene ether, polyether ether ketone, polyamideimide, polyethylene telephthalate, epoxy resins and urethane resins. Examples of the additives include zinc oxide, titanium oxide, silica, alumina, red iron oxide, ferrite, tungsten oxide, ytterbium oxide, barium sulfate, tungsten, molybdenum, glass fiber and silicone particles.

In view of the impedance matching of the acoustic matching layer 130, for example, it is preferable that the surface part of the acoustic matching layer 130 is constituted by an epoxy resin and contains silicone particles. By dispersing silicone, which is the material of the acoustic lens 140, in the substrate of the acoustic matching layer 130, the acoustic impedance of the acoustic matching layer 130 can be closer to the acoustic impedance of the acoustic lens 140.

The thickness of the acoustic matching layer 130 is not specifically limited as long as the above-mentioned function can be exerted, and is, for example, from 30 µm or more and 500 µm or less.

In addition, from the viewpoint of improving the adhesiveness between the piezoelectric element 120 and the acoustic matching layer 130, it is preferable that at least a part of the acoustic matching layer 130 is laminated on the piezoelectric element 120 via an adhesive layer. Examples of the material for the adhesive layer include a silicone-based adhesive and an epoxy-based adhesive.

(Acoustic Lens)

The acoustic lens 140 according to the present embodiment is constituted by a vulcanization-molded article containing a rubber composition containing a first silicone rubber composition and a second silicone rubber composition having different plasticity numbers from each other. The first silicone rubber composition and the second silicone rubber composition contain a silicone rubber.

A silicone rubber is a rubbery silicone resin having siloxane bonds (Si—O bonds) as a molecular backbone. A rubbery silicone resin containing dimethylpolysiloxane as a major component is preferable. The rubbery silicone resin may also contain diphenylsiloxane, methylphenylsiloxanemethylvinylsiloxane or methyl-3,3,3-trifluoropropylsiloxane.

Furthermore, the polymerization degree of the rubbery silicone resin is preferably 3,000 or more and 10,000 or less. The rubbery silicone resin may contain a silicone compound represented by the following formula (1), a silicone compound represented the following formula (2), or both of these compounds.

$$R^1(R^1{}_2SiO)_x(R^1R^2SiO)_ySiR^1{}_3 \quad (1)$$

wherein $R^1$ is a monovalent hydrocarbon group or a hydrogen atom, $R^2$ is an alkyl group or a polyether group, X is an integer of 0 or more, and Y is an integer of 1 or more.

In the formula (1), the order of the $R^1{}_2SiO$ moiety and the $R^1R^2SiO$ moiety may be either continuous or random.

$$R^3{}_aSiO_{(4-a)/2} \quad (2)$$

wherein $R^3$ is a monovalent hydrocarbon group, and a is 1.95 to 2.05.

In the formula (2), the $R^3$ has a carbon number of 1 to 12. The carbon number of the $R^3$ is preferably from 1 to 8. Specific examples of the $R^3$ include alkyl groups such as a methyl group, an ethyl group, a propyl group, a butyl group, a hexyl group and an octyl group; cycloalkyl groups such as a cyclopentyl group and a cyclohexyl group; alkenyl groups such as a vinyl group and a propenyl group; aryl groups such as a cycloalkenyl group, a phenyl group and a tolyl group; aralkyl groups such as a benzyl group and a 2-phenylethyl group; a chloromethyl group, a trifluoropropyl group and a cyanoethyl group, which are obtained by substituting a part of or whole hydrogen atoms of these functional groups with halogen atom(s) such as fluorine and chlorine, or a cyano group. The $R^3$ is preferably a methyl group, a vinyl group, a phenyl group or a trifluoropropyl group.

It is preferable that the rubbery silicone resin contains an organopolysiloxane having aliphatic unsaturated hydrocarbon groups such as an alkenyl group and a cycloalkenyl group. The number of the aliphatic unsaturated hydrocarbon groups is 2 to 50. It is preferable that the number of the aliphatic unsaturated hydrocarbon groups is 2 to 20.

The molecular structure of the silicone compound represented by the formula (2) is linear, and may or may not have a branched structure on a part of the molecular structure. Furthermore, it is preferable that both ends of the molecular chain of the silicone compound represented by the formula (2) are capped with triorganosiloxy groups ($R^3{}_3SiO_{1/2}$) such as a trimethylsiloxy group, a dimethylphenylsiloxy group, a vinyldimethylsiloxy group, a divinylmethylsiloxy group and a trivinylsiloxy group; or hydroxydiorganosiloxy groups ($R^3{}_2(HO)SiO_{1/2}$) such as a hydroxydimethylsiloxy group.

The first silicone rubber composition and the second silicone rubber composition may further contain other components other than the silicone rubber in the scope in which the effect of the present exemplary embodiment can be obtained. Examples of the other components include a filler for adjusting the plasticity number of the first silicone rubber composition and the plasticity number of the second silicone rubber composition. In the present embodiment, the first silicone rubber composition does not contain any filler, whereas the second silicone rubber composition contains a filler. Examples of the material for the filler include silica, alumina, carbon black, calcium carbonate and zinc oxide. The filler interacts with the silicone rubber in the first silicone rubber composition and the second silicone rubber composition to thereby form a crosslinked structure. As a result thereof, the plasticity number of the first silicone rubber composition and the plasticity number of the second silicone rubber are increased.

The first silicone rubber composition and the second silicone rubber composition may be slightly phase-separated, or may not be phase-separated, as long as the effect of the present exemplary embodiment can be obtained. From the viewpoints of suppressing the attenuation of ultrasonic waves and obtaining sufficient physical strength, it is preferable that the first silicone rubber composition and the second silicone rubber composition are not phase-separated from each other. From the viewpoint that the first silicone rubber composition and the second silicone rubber composition are mixed so as not to be phase-separated from each other, it is preferable that the content of the first silicone rubber composition, which has a lower plasticity number, is high, and the content of second silicone rubber composition, which has a higher plasticity number, is low. Furthermore, the phase separation can be detected, for example, by measuring glass transition temperatures by a commercially available differential scanning calorimetry (DSC). Specifically, since glass transition temperatures are different in the case when phase separation occurs and in the case when phase separation does not occur, the presence or absence of layer separation can be judged based on the result of the measurement of glass transition temperatures. For example, in the case when two glass transition temperatures are detected, it can be judged that complete phase separation has occurred. The phase separation may also be directly confirmed by utilizing an atomic force microscope (AFM), light scattering or the like.

From the viewpoint of obtaining sufficient chemical stability and physical strength while suppressing the attenuation of ultrasonic waves, the first silicone rubber composition has a plasticity number of 100 or less, and the second silicone rubber composition has a plasticity number of 150 or more and 300 or less. When the plasticity number of the first silicone rubber composition is more than 100, or the plasticity number of the second silicone rubber composition is less than 150, it is possible that sufficient chemical stability and physical strength cannot be obtained while suppressing the attenuation of ultrasonic waves. Furthermore, when the plasticity number of the second silicone rubber composition is more than 300, the first silicone rubber composition and the second silicone rubber composition are not sufficiently mixed from each other, and thus excess phase separation occurs; as a result, it is possible that the ultrasonic wave attenuates, and sufficient physical strength cannot be obtained.

The "plasticity number" used herein is a value showing the viscoelasticity of an unvulcanized silicone rubber composition. For example, a smaller plasticity number represents that a silicone rubber composition is modified more easily. The plasticity number has a correlationship with the attenuation of ultrasonic waves and the physical strength of the acoustic lens 140. At a smaller plasticity number, the attenuation of the ultrasonic wave is smaller, whereas the physical strength of the acoustic lens 140 decreases. The plasticity numbers of the first silicone rubber composition and the second silicone rubber composition in the acoustic lens 140 can be presumed by conducting elemental analysis of a cross-sectional surface of the acoustic lens 140 by an electron microscope. For example, in the acoustic lens 140 of the present embodiment, in the case when the first silicone rubber composition and the second silicone rubber composition are slightly phase-separated, the part in which the filler is not dispersed can be presumed to be the first silicone rubber composition, and the part in which the filler is dispersed can be presumed to be the second silicone rubber composition. Together with this, based on the content of the filler, the plasticity number of the first silicone rubber composition and the plasticity number of the second silicone rubber composition can be presumed.

The plasticity number can be adjusted by, for example, the molecular weight, molecular weight distribution and molecule structure of the silicone rubber, and addition of a filler. For example, the plasticity number is larger at a higher molecular weight of the silicone rubber. Furthermore, the plasticity number is larger at a higher interaction between the filler and the silicone rubber. Furthermore, the plasticity number increases as the addition amount of the filler increases. For example, the plasticity number of the first silicone rubber composition to which any filler is not added is 100 or less.

From the viewpoint of obtaining sufficient chemical stability and physical strength while suppressing the attenuation of ultrasonic waves, the mass ratio of the first silicone rubber composition to the second silicone rubber composition is preferably 10 parts by mass:90 parts by mass to 90 parts by mass:10 parts by mass, more preferably from 30 parts by mass:70 parts by mass to 70 parts by mass:30 parts by mass.

The first silicone rubber composition may be a commercially available product. For example, the first silicone rubber composition is TSE201 (plasticity number: 91, density: 1.0 g/cm$^3$) manufactured by Momentive Performance Materials Inc.

The second silicone rubber composition may also be a commercially available product. For example, the second silicone rubber composition is XE20-00510 (plasticity number: 110, density: 1.1 g/cm$^3$) manufactured by Momentive Performance Materials Inc.; Shin-Etsu Silicone KE541U manufactured by Shin-Etsu Chemical Co., Ltd. (plasticity number: 150, density: 1.1 g/cm$^3$, "Shin-Etsu Silicone" is the registered trademark of this company (hereinafter omitted)), KE551U (plasticity number: 200, density: 1.1 g/cm$^3$), KE555U (plasticity number: 310, density: 1.2 g/cm$^3$), KE561U (plasticity number: 250, density: 1.2 g/cm$^3$), KE571U (plasticity number: 360, density: 1.2 g/cm$^3$), KE752U (plasticity number: 200, density: 1.3 g/cm$^3$), KE772U (plasticity number: 270, density: 1.4 g/cm$^3$) and KE782U (plasticity number: 330, density: 1.4 g/cm$^3$).

Furthermore, in view of the adjustment of the acoustic velocity, specific gravity and density in the acoustic lens 140, the acoustic lens 140 may further contain inorganic particles. The specific gravity of the inorganic particles is preferably 3 or more and less than 7. If the specific gravity of the inorganic particles is too small, the specific gravity of the acoustic lens 140 cannot be adjusted to a desired size in some cases. Furthermore, if the specific gravity of the inorganic particles is too large, the acoustic velocity in the acoustic lens 140 excessively decreases in some cases, and consequently it is possible that it becomes difficult to obtain a high acoustic velocity while suppressing the attenuation of ultrasonic waves.

The content of the inorganic particles in the acoustic lens 140 may be suitably adjusted depending on the kind of the inorganic particles, the size of the inorganic particles, the specific gravity of the inorganic particles, and the like. The content of the inorganic particles in the acoustic lens 140 is, for example, 10 parts by mass or more and 150 parts by mass or less.

Examples of the inorganic particles include metal oxide particles such as silica, alumina, titanium oxide, zinc oxide and ytterbium oxide; and metal particles such as gold and platinum. The kind of the inorganic particles may be either one or more kind(s).

The number average particle size of the inorganic particles is preferably 0.05 µm or more and 0.5 µm or less. If the number average particle size of the inorganic particles is too large, it is possible that the inorganic particles scatter ultrasonic waves to thereby attenuate the ultrasonic wave. Furthermore, if the number average particle size of the inorganic particles is too small, the mixing property of the inorganic particles in the silicone rubber composition decreases, and thus the ultrasonic wave may be attenuated, and it is possible that the molding of the acoustic lens 140 becomes difficult. The number average particle size of the inorganic particles is a number average value of values that are obtained by measuring the particle sizes of 100 particles by an observation under an electron microscope. The particle size herein refers to an average value of the long diameters and short diameters of the particles obtained from an image by an observation under an electron microscope.

It is preferable that the acoustic lens 140 has a specific gravity of 1.2 or more and 1.6 or less. If the specific gravity of the acoustic lens 140 is too large or too small, it is possible that the acoustic impedance of the acoustic lens 140 cannot be adjusted to a desired magnitude. The specific gravity of the acoustic lens 140 can be measured by using, for example, a known electron specific gravity meter (SD-200L; manufactured by Alpha Mirage Co., Ltd.).

[Method for Producing Acoustic Lens]

An example of a method for producing the acoustic lens 140 is explained here. The method for producing the acoustic lens 140 includes a step of preparing a rubber composition by kneading the first silicone rubber composition and the second silicone rubber composition, and subjecting the rubber composition to vulcanization molding.

First, the first silicone rubber composition having a plasticity number of 100 or less and the second silicone rubber composition having a plasticity number of 150 or more and 300 or less are kneaded. By this way, a rubber composition can be prepared. The method for kneading can be selected from known methods. For example, the first silicone rubber composition and the second silicone rubber composition can be mixed in a known roll kneader.

The plasticity numbers of the first silicone rubber composition and the second silicone rubber composition can be measured according to JIS K6249; 2003 (ISO 7323) by using a known parallel plate plastometer (Williams plastometer; manufactured by Yasuda Seiki Seisaku-sho Ltd.).

Furthermore, inorganic particles can further be kneaded when the first silicone rubber composition and the second silicone rubber composition are kneaded. As mentioned above, as the inorganic particles, inorganic particles having a number average particle size of 0.05 µm or more and 0.5 µm or less are preferably used. Furthermore, it is preferable that the first silicone rubber composition is mixed by little and little from the viewpoint that the first silicone rubber composition and the second silicone rubber composition are mixed so that they are not phase-separated from each other.

In the step for preparing the rubber composition, other additives may be added within the scope that the properties of the acoustic lens 140 are not deteriorated. Examples of the kinds of the other additives include the inorganic particles, reinforcing agents, and disperse agents for the reinforcing agents. Examples of the materials for the other additives include silica, titanium oxide, alumina, cerium oxide, iron oxide, zinc oxide, ytterbium oxide, barium sulfate, organic substance fillers and coloring pigments.

Subsequently, the rubber composition is subjected to vulcanization molding. Specifically, it is preferable to further knead a vulcanizing agent with the rubber composition, and subject the rubber composition to press molding. At this time, the vulcanization temperature is, for example, 110° C. or more and 190° C. or less. The vulcanization time is, for example, 5 minutes or more and 30 minutes or less.

Examples of the kinds of the vulcanizing agent include peroxide-based vulcanizing agents such as 2, 5-dimethyl-2, 5-ditertiarybutylperoxyhexane, p-methylbenzoylperoxide and ditertiarybutylperoxide. It is preferable that the addition amount of the vulcanizing agent is, for example, 0.3 parts by mass or more and 5 parts by mass or less with respect to 100 parts by mass of the silicone rubber.

Furthermore, from the viewpoints of stabilization of the vulcanization and removal of impurities having low molecular weights, it is preferable to conduct a secondary vulcanization treatment. The vulcanization temperature in the secondary vulcanization treatment is, for example, 200° C. or more and 240° C. or less. The vulcanization time in the secondary vulcanization treatment is, for example, 2 minutes or more and 10 minutes or less. At this time, a vulcanization aid such as sulfur, zinc oxide or the like may further be added. By using zinc oxide as the vulcanization aid, the vulcanization can be promoted and thus the vulcanization time can be shortened without substantially deteriorating the lens property of the acoustic lens 140.

As mentioned above, the acoustic lens 140 of the present embodiment is constituted by a vulcanization-molded article of the rubber composition containing the first silicone rubber composition and the second silicone rubber composition. The first silicone rubber composition having a small plasticity number decreases the physical strength of the acoustic lens 140, but can significantly suppress the attenuation of ultrasonic waves. On the other hand, the second silicone rubber composition having a large plasticity number attenuates the ultrasonic wave, but can enhance the physical strength of the acoustic lens 140. That is, by mixing the first silicone rubber composition and the second silicone rubber composition with each other, the acoustic lens 140 that suppress the attenuation of ultrasonic waves and is also excellent in physical strength can be attained. Furthermore, since the acoustic lens 140 is constituted by the vulcanization-molded article of the rubber composition containing the silicone rubber compositions, the acoustic lens 140 is also excellent in chemical stability as compared to conventional acoustic lenses containing a butadiene-based rubber.

Furthermore, the ultrasonic probe 100 of the present embodiment has the acoustic lens 140, which is excellent in acoustic property and durability. As a result, the ultrasonic probe 100 has sensitivity against ultrasonic waves over a long period.

Furthermore, the ultrasonic imaging device 200 of the present embodiment has the ultrasonic probe 100, which is excellent in acoustic property and durability. As a result, the ultrasonic imaging device 200 has sensitivity against ultrasonic waves over a long period and thus can examine a subject at high accuracy and high reliability over a long period.

The ultrasonic imaging device 200 can be applied to medical ultrasonic diagnosing devices. Furthermore, the ultrasonic imaging device 200 can also be applied to other devices that display a result of an exploration by ultrasonic waves as an image, a numerical value or the like such as a fish sonar (sonar) and a flaw detector for nondestructive examination.

Although the case when the piezoelectric element 120 having the sending piezoelectric body 121 and the receiving piezoelectric body 123 has been explained in the ultrasonic probe 100 of the present embodiment, it is also possible that one piezoelectric body sends and receives ultrasonic waves.

Furthermore, although the case when the sending piezoelectric body 121 and receiving piezoelectric body 123 are disposed on the top and bottom has been explained in the ultrasonic probe 100 of the present embodiment, the sending piezoelectric body 121 and the receiving piezoelectric body 123 may also be disposed in parallel. Alternatively, plural sending and receiving piezoelectric bodies may be disposed in parallel.

As is apparent from the above-mentioned explanation, the acoustic lens according to the present embodiment is an acoustic lens for an ultrasonic probe, and is constituted by a vulcanization-molded article of a rubber composition containing a first silicone rubber composition having a plasticity number of 100 or less and a second silicone rubber composition having a plasticity number of 150 or more and 300 or less. Therefore, the acoustic lens is excellent in chemical stability and physical strength while suppressing the attenuation of ultrasonic waves. Furthermore, an ultrasonic probe and an ultrasonic imaging device having the acoustic lens have high sensitivity against ultrasonic waves.

That the acoustic lens has a specific gravity of 1.2 or more and 1.6 or less is more effective from the viewpoints of adjustment of the acoustic impedance of the acoustic lens and suppression of the attenuation of ultrasonic waves.

To further contain inorganic particles having a specific gravity of 3 or more and less than 7 is more effective from the viewpoints of adjustment of the acoustic impedance and suppression of the attenuation of ultrasonic waves by adjustment of the specific gravity of the acoustic lens.

That the inorganic particles has a number average particle size of 0.05 μm or more and 0.5 μm or less is more effective from the viewpoints of suppression of the attenuation of ultrasonic waves, and the moldability of the acoustic lens.

Furthermore, the method for producing acoustic lens of the present embodiment is a method for producing an acoustic lens for an ultrasonic probe, including the steps of: preparing a rubber composition by kneading a first silicone rubber composition having a plasticity number of 100 or less and a second silicone rubber composition having a plasticity number of 150 or more and 300 or less, and subjecting the rubber composition to vulcanization molding. Accordingly, an acoustic lens that is excellent in chemical stability and physical strength while suppressing the attenuation of ultrasonic waves can be provided.

That the step of preparing the rubber composition is a step of kneading the first silicone rubber composition, the second silicone rubber composition, and inorganic particles having a specific gravity of 3 or more and less than 7 is more effective from the viewpoints of adjustment of the acoustic impedance of the acoustic lens and suppression of the attenuation of ultrasonic waves.

To use inorganic particles having a number average particle size of 0.05 μm or more and 0.5 μm or less as the inorganic particles is more effective from the viewpoints of suppression of the attenuation of ultrasonic waves, and the moldability of the acoustic lens.

Examples

The present invention will be explained with referring to Examples, but the present invention is not limited to these Examples.

In the present Examples, a sheet for evaluation was prepared by a material for an acoustic lens, and the acoustic property was examined on the prepared sheet.

1. Preparation of Sheet
(Preparation of Sheet 1)

As a filler, titanium oxide particles carrying aluminum oxide on the surfaces thereof and the surfaces of which had been treated with an organic acid ($TiO_2$, CR60-2; manufactured by Ishihara Sangyo Kaisha, Ltd.) were prepared. The number average particle size of the titanium oxide particles was measured by an observation under an electron microscope. The number average particle size of the titanium oxide particles was 0.21 μm.

The titanium oxide particles were laid thinly on a stainless pad, and this pad was allowed to stand under an environment at 140° C. for 4 hours. By this way, the moisture and the like attached to the titanium oxide particles were removed.

Subsequently, the following components were mixed at the following amounts and kneaded in a 6-inch double roll kneader to prepare a rubber composition. The content of the titanium oxide particles at this time is a content based on Silicone rubber composition A and Silicone rubber composition B (100 parts by mass).

| Silicone rubber composition A | 70 parts by mass |
| Silicone rubber composition B | 30 parts by mass |
| Titanium oxide | 75 parts by mass |

As Silicone rubber composition A, TSE201 manufactured by Momentive Performance Materials Inc. (plasticity number: 91, density: 1.0 g/cm$^3$) was used, and as Silicone rubber composition B, KE541U manufactured by Shin-Etsu Chemical Co., Ltd. (plasticity number: 150, density: 1.1 g/cm$^3$) was used. The plasticity numbers of the silicone rubber compositions were measured according to the method as prescribed in JIS K6249 (2003) by means of a parallel plate plastometer (Williams plastometer; manufactured by Yasuda Seiki Seisaku-sho Ltd.).

Subsequently, 0.5 parts by mass of 2, 5-dimethyl-2, 5-di(t-butylperoxy) hexane as a vulcanizing agent was added to 100 parts by mass of the rubber composition, and the mixture is further mixed by a 6-inch double roll kneader. Furthermore, this mixture was press-molded at 165° C. for 10 minutes, and further subjected to secondary vulcanization at 200° C. for 2 hours, whereby Sheet 1 having a thickness of 2 mm was prepared.

(Preparation of Sheets 2 and 3)

Sheets 2 and 3 were prepared in a similar manner to that for Sheet 1, except that the mixing ratio of the silicone rubber compositions and the content of the filler were changed as shown in Table 1.

(Preparation of Sheet 4)

Sheet 4 was prepared in a similar manner to that for Sheet 1, except that Silicone rubber composition C was used instead of Silicone rubber composition B, and barium sulfate ($BaSO_4$) particles were used instead of the titanium oxide particles. As Silicone rubber composition C, KE561U manufactured by Shin-Etsu Chemical Co., Ltd. (plasticity number: 250, density: 1.2 g/cm³) was used. As the barium sulfate, B-30 manufactured by Sakai Chemical Industry Co., Ltd. was used.

(Preparation of Sheet 5)

Sheet 5 was prepared in a similar manner to that for Sheet 4, except that zinc oxide (ZnO) was used instead of the barium sulfate, and the content of the filler was changed as shown in Table 1. As the zinc oxide, MZ-506X manufactured by Tayca Corporation was used.

(Preparation of Sheet 6)

Sheet 6 was prepared in a similar manner to that for Sheet 4, except that ytterbium oxide (YbO) was used instead of the barium sulfate, and the content of the filler was changed as shown in Table 1. As the ytterbium oxide, nanoparticle-type ytterbium oxide manufactured by Shin-Etsu Chemical Co., Ltd. was used.

(Preparation of Sheets 7 to 9)

Sheet 7 was prepared in a similar manner to that for Sheet 1, except that Silicone rubber composition C was used instead of Silicone rubber composition B. Furthermore, Sheets 8 and 9 were prepared in a similar manner to that for Sheet 1, except that the mixing ratio of the silicone rubber compositions and the content of the titanium oxide particles were changed as shown in Table 1.

(Preparation of Sheet 10)

Sheet 10 was prepared in a similar manner to that for Sheet 1, except that Silicone rubber composition D was used instead of Silicone rubber composition B, and Silicone rubber composition A and the titanium oxide particles were not added. As Silicone rubber composition D, KE752U manufactured by Shin-Etsu Chemical Co., Ltd. (plasticity number: 200, density: 1.3 g/cm³) was used.

(Preparation of Sheet 11)

Sheet 11 was prepared in a similar manner to that for Sheet 2, except that a butadiene rubber composition was further used in addition to Silicone rubber composition B, and Silicone rubber composition A and the titanium oxide particles were not added. The butadiene rubber composition had a plasticity number of 230.

(Preparation of Sheet 12)

Sheet 12 was prepared in a similar manner to that for Sheet 1, except that the content of the titanium oxide particles was changed as shown in Table 1, and Silicone rubber composition B was not added.

(Preparation of Sheet 13)

Sheet 13 was prepared in a similar manner to that for Sheet 2, except that Silicone rubber composition C and Silicone rubber composition E were used instead of Silicone rubber composition A and Silicone rubber composition B. As Silicone rubber composition E, XE20-00510 manufactured by Momentive Performance Materials Inc. (plasticity number: 110, density: 1.1 g/cm³) was used.

(Preparation of Sheet 14)

Sheet 14 was prepared in a similar manner to that for Sheet 2, except that Silicone rubber composition F was used instead of Silicone rubber composition B, and the content of the titanium oxide particles was changed as shown in Table 1. As Silicone rubber composition F, KE571U manufactured by Shin-Etsu Chemical Co., Ltd. (plasticity number: 360, density: 1.2 g/cm³) was used.

(Preparation of Sheet 15)

Sheet 15 was prepared in a similar manner to that for Sheet 14, except that Silicone rubber composition G was used instead of Silicone rubber composition F. As Silicone rubber composition G, KE555U manufactured by Shin-Etsu Chemical Co., Ltd. (plasticity number: 310, density: 1.2 g/cm³) was used.

For Sheets 1 to 15, the sheet number, the kinds of the silicone rubber compositions, the mixing ratio of the silicone rubber compositions (simply referred to as "mixing ratio" in Table 1), the kind of the filler, the content of the filler, and the classification are shown in Table 1. In Table 1, the content of the filler is the content against 100 parts by mass of the silicone rubber composition.

TABLE 1

| | Silicone rubber composition | | | Filler | | |
|---|---|---|---|---|---|---|
| Sheet No. | Kind | Flexibility degree | Mixing ratio [parts by mass] | Kind | Content [parts by mass] | Classification |
| 1 | TSE201 | 91 | 70 | $TiO_2$ | 75 | Examples |
|   | KE541U | 150 | 30 | | | |
| 2 | TSE201 | 91 | 50 | $TiO_2$ | 70 | |
|   | KE541U | 150 | 50 | | | |
| 3 | TSE201 | 91 | 30 | $TiO_2$ | 65 | |
|   | KE541U | 150 | 70 | | | |
| 4 | TSE201 | 91 | 70 | $BaSO_4$ | 75 | |
|   | KE561U | 250 | 30 | | | |
| 5 | TSE201 | 91 | 70 | ZnO | 70 | |
|   | KE561U | 250 | 30 | | | |
| 6 | TSE201 | 91 | 70 | YbO | 65 | |
|   | KE561U | 250 | 30 | | | |
| 7 | TSE201 | 91 | 70 | $TiO_2$ | 75 | |
|   | KE561U | 250 | 30 | | | |
| 8 | TSE201 | 91 | 50 | $TiO_2$ | 70 | |
|   | KE561U | 250 | 50 | | | |
| 9 | TSE201 | 91 | 30 | $TiO_2$ | 65 | |
|   | KE561U | 250 | 70 | | | |
| 10 | KE752U | 200 | 100 | — | — | Comparative Examples |
| 11 | KE541U | 150 | 50 | — | — | |
|   | Butadiene rubber | 230 | 50 | | | |
| 12 | TSE201 | 91 | 100 | $TiO_2$ | 90 | |
| 13 | XE20-C0510 | 110 | 50 | $TiO_2$ | 70 | |
|   | KE561U | 250 | 50 | | | |
| 14 | TSE201 | 91 | 50 | $TiO_2$ | 50 | |
|   | KE571U | 360 | 50 | | | |
| 15 | TSE201 | 91 | 50 | $TiO_2$ | 50 | |
|   | KE555U | 310 | 50 | | | |

2. Evaluation of Sheets (1) Evaluation of Acoustic Impedance

The density of each of Sheets 1 to 15 was obtained at 25° C. by the method as prescribed in JIS C2123. Furthermore, for each of Sheets 1 to 15, the acoustic velocity at 25° C. was measured at a measurement frequency wave number of 10 MHz by an acoustic velocity measurement device (a sing around-type acoustic velocity measurement device Type UVM-2; manufactured by Ultrasonic Engineering Co., Ltd.). Subsequently, the acoustic impedance of each of Sheets 1 to 15 was calculated from the product of the density and the acoustic velocity of the sheet. Generally, MRayl is used as the unit of acoustic impedance, and 1 MRayl is $1 \times 10^6$ kg/m²/s ($1 \times 10^6$ Pa·s/m). From the viewpoint of endurance for practical use, the case when the acoustic impedance is 1.3 (MRayl) or more was judged to be acceptable.

(2) Evaluation of Attenuation Rate

Each of Sheets 1 to 15 was put into a water bath filled with water of 25° C., and in such state, ultrasonic waves of 10 MHz were generated by an ultrasonic pulsar and receiver JPR-10C (manufactured by Japan Probe Co., Ltd.), and the amplitude before the transmission of the ultrasonic wave through the sheet and the amplitude after the ultrasonic wave has transmitted through the sheet were measured. An attenuation rate was calculated from the amplitudes before and after the transmission of the ultrasonic wave through the sheet. From the viewpoint of endurance for practical use, in the case when the attenuation rate was 7 dB/mm or less was judged to be acceptable.

(3) Evaluation of Rubber Hardness

For Sheets 1 to 15, the rubber hardness was measured according to JIS K6253 (2012) by using a Durometer A (ASKER Type A; manufactured by Kobunshi Keiki Co., Ltd.). From the viewpoint of endurance for practical use, the case when the rubber hardness is greater than 40 was judged to be acceptable.

(4) Evaluation of Abrasion Property

For Sheets 1 to 15, an abrasion amount by an abrasion wheel CS-10 was measured according to the method as prescribed in JIS K7204 by using a rotary abrasion tester (manufactured by Toyo Seiki Seisaku-sho, Ltd.). The change in the weight of the sheet before and after the abrasion (abrasion amount) was measured, and a weight fraction of the abrasion amount with respect to the weight of the sheet before the abrasion was calculated. From the viewpoint of endurance for practical use, the case when the weight fraction was 2% or less was judged to be acceptable.

(5) Evaluation of Discoloration

For Sheets 1 to 15, each sheet was allowed to stand still in the state that the sheet was immersed in a test solution in a thermostat bath at 40° C. for 1 month. As the test solution, A. Cidexplus 28 (an antiseptic solution, manufactured by Johnson & Johnson K. K., "Cidexplus" is the registered trademark of this company), B. Disopa (an antiseptic solution, manufactured by Johnson & Johnson K. K., "Disopa" is the registered trademark of this company), and C. Aquasonic 100 Gel (manufactured by Parker Laboratories, Inc., "Aquasonic 100" is the registered trademark of this company) were used. Each of Sheets 1 to 15 was immersed in each of the test solutions A to C, and the sheet that had been immersed in the test solution and the sheet that had not been immersed in the test solution were compared by visual observation, and the discoloration by the immersion was evaluated according to the following criteria.

A: The sheet was discolored little in the test solutions A to C.
B: The sheet was discolored evenly and slightly in the test solutions A and B.
C: The sheet was discolored in a patchy fashion or discolored evenly and strongly in the test solutions A and B.
D: The sheet was discolored in a patchy fashion or discolored evenly and strongly in the test solutions A to C.

For each of Sheets 1 to 15, the sheet number, the acoustic impedance (simply represented by "Z" in Table 2), the attenuation rate, the rubber hardness, the abrasion property, the result of the evaluation of the discoloration and the classification are shown in Table 2.

3. Preparation of Ultrasonic Probe (Ultrasonic Probe 1)

(1) Backing Layer

The following components were sufficiently mixed at the following amounts in a vacuum mixer (ARV-310; manufactured by Thinky Corporation). Subsequently, 9 parts by mass of Silicone rubber H was further mixed, whereby Mixture A was obtained.

| | |
|---|---|
| Silicone rubber composition H | 91 parts by mass |
| Tungsten oxide | 750 parts by mass |

As the Silicone rubber composition H, TSE3032 (A) manufactured by Momentive Performance Materials Inc. was used. As the tungsten oxide, a tungsten trioxide powder ($A_2$-$WO_3$; manufactured by Allied Material Corporation) was used.

Subsequently, Mixture A was put into a mold of 100 mm×100 mm×30 mm, and allowed to stand still under vacuum at room temperature for 3 hours in the state that the mixture was pressurized by a vacuum electrothermal press machine (OHV-H; manufactured by Oji Machine Co., Ltd.) under a pressure of 4.9 MPa (50 kg/cm$^2$), and heated at 50° C. for 3 hours. By this way, a block (density: 7.3 g/cm$^3$) was prepared. The block was cut into 1 cm cubes, pulverized by a cutter mill (VM-20; manufactured by Makino MFG Co., Ltd.), and further pulverized by a pin mill (M-4; manufactured by Nara Machinery Co., Ltd.) at a screen of 0.5 mm and a rotation number of 2,800 rpm. Subsequently, the pulverized block was screened by a circular oscillation screening machine (KG-400; manufactured by Nishimura Machine Works Co., Ltd.) through a mesh with an opening of 212 μm, whereby composite particles were prepared.

Subsequently, the following components were sufficiently mixed at the following amounts in a vacuum mixer (ARV-310; manufactured by Thinky Corporation). Subsequently, 9 parts by mass of a crosslinking agent (jER Cure ST-12 manufactured by Mitsubishi Chemical Corporation; "jER Cure" is the registered trademark of this company) was further mixed, whereby Mixture B was obtained.

| | |
|---|---|
| Epoxy resin | 91 parts by mass |
| The composite particles | 380 parts by mass |

TABLE 2

| Sheet No. | Z [MRayl] | Attenuation rate [dB/mm] | Rubber hardness [—] | Abrasion property [%] | Discoloration | Classification |
|---|---|---|---|---|---|---|
| 1 | 1.35 | 6.7 | 49 | 1.4 | A | Examples |
| 2 | 1.34 | 6.7 | 50 | 1.3 | A | |
| 3 | 1.37 | 6.5 | 52 | 1.4 | A | |
| 4 | 1.37 | 6.3 | 51 | 1.3 | A | |
| 5 | 1.39 | 7.0 | 49 | 1.2 | A | |
| 6 | 1.37 | 6.9 | 48 | 2.0 | A | |
| 7 | 1.38 | 6.9 | 58 | 1.4 | A | |
| 8 | 1.36 | 6.8 | 57 | 1.4 | A | |
| 9 | 1.37 | 6.3 | 51 | 1.3 | A | |
| 10 | 1.25 | 8.8 | 49 | 1.6 | A | Comparative Examples |
| 11 | 1.21 | 7.6 | 35 | 3.7 | C | |
| 12 | 1.36 | 6.5 | 19 | 1.9 | A | |
| 13 | 1.35 | 11.5 | 44 | 2.5 | A | |
| 14 | 1.35 | 11.8 | 43 | 1.4 | A | |
| 15 | 1.34 | 12.1 | 52 | 1.5 | A | |

As the epoxy resin, Albidur EP2240 manufactured by NANORESIN ("Albidur" is the registered trademark of this company).

Subsequently, Mixture B was put into a mold of 100 mm×100 mm×30 mm, and allowed to stand still under vacuum at room temperature for 4 hours in the state that the mixture was pressurized by a vacuum electrothermal press machine (OHV-H; manufactured by Oji Machine Co., Ltd.) under a pressure of 9.9 MPa (100 kg/cm$^2$), and heated at 60° C. for 3 hours. By this way, a backing block (density: 2.65 g/cm$^3$, acoustic impedance: 2.9 MRayls, attenuation constant: 30 dB/cm/MHz) was prepared. The backing block was cut into a thickness of 6 mm by a wire saw (CS-203; manufactured by Musashino-Denshi), and polished to a thickness of 5 mm by a precise polishing device (MA-200; manufactured by Musashino-Denshi). By the above-mentioned steps, a backing layer was prepared.

(2) FPC (Flexible Printed Substrate)

An FPC was disposed on the backing layer, and fixed by an adhesive.

(3) Piezoelectric Layer

A lead titanate zirconate (PZT) wafer (3203HD; manufactured by CTS Electro Component Inc.) having a thickness 0.13 mm having electrodes formed on both surfaces thereof was disposed on the surface of the FPC, and fixed by an adhesive.

(4) Acoustic Matching Layer

The following components were sufficiently mixed at the following amounts in a vacuum mixer (ARV-310; manufactured by Thinky Corporation). Subsequently, 32 parts by mass of a crosslinking agent (jER Cure ST-12 manufactured by Mitsubishi Chemical Corporation; "jER Cure" is the registered trademark of this company) was further mixed, whereby Mixture C was obtained.

| | |
|---|---|
| Epoxy resin | 68 parts by mass |
| Additive | 25 parts by mass |

As the epoxy resin, jER-828 manufactured by Mitsubishi Chemical Corporation ("jER" is the registered trademark of this company) was used. As the additive, KMP600 manufactured by Shin-Etsu Chemical Co., Ltd. was used.

Subsequently, Mixture C was put into a mold of 100 mm×100 mm×30 mm, and allowed to stand still under vacuum at room temperature for 4 hours in the state that the mixture was pressurized by a vacuum electrothermal press machine (OHV-H; manufactured by Oji Machine Co., Ltd.) under a pressure of 9.8 MPa (100 kg/cm$^2$), and heated at 60° C. for 3 hours. By this way, a matching material block (density: 1.12 g/cm$^3$, acoustic impedance: 2.0 MRayls, acoustic velocity: 1,750 m/s) was prepared. The matching material block was polished by a wire saw (CS-203; manufactured by Musashino-Denshi) to a thickness of 0.50 mm, and polished to a thickness of 0.050 mm by a precise polishing device (MA-200; manufactured by Musashino-Denshi). By the above-mentioned steps, Matching Material 1 was prepared.

Furthermore, Matching Material 2 was prepared in a similar manner to that for Matching Material 1, except that 50 parts by mass of an EP007K base agent (manufactured by Cemedine Co., Ltd.) was used instead of 68 parts by mass of jER-828 as the epoxy resin, 105 parts by mass of ferrite (KNS-415; Todakogyo Corp.) was used as the additive instead of 25 parts by mass of Shin-Etsu Silicone KMP600, and 50 parts by mass of an EP0007K curing agent (manufactured by Cemedine Co., Ltd.) was used as the crosslinking agent instead of 32 parts by mass of jER Cure ST-12.

Furthermore, Matching Material 3 was prepared in a similar manner to that for Matching Material 2, except that the content of the additive was changed from 105 parts by mass to 400 parts by mass.

(Dicing)

Subsequently, Matching Material 1, Matching Material 2 and Matching Material 3 were stacked in this order, and fixed by a two-liquid type epoxy-based adhesive (E Set L; manufactured by Konishi Co., Ltd.). At this time, Matching Materials 1 to 3 were pressurized at 49 N at an ordinary temperature (25° C.) for 5 minutes in the state that they were stacked via the two-liquid type epoxy-based adhesive, pressurized at 294 N at ordinary temperature (25° C.) for 5 hours, and further pressurized at 294 N at 50° C. for 3 hours, whereby Matching Materials 1 to 3 were fixed one another by the adhesive. By the above-mentioned steps, an acoustic matching layer was prepared. By this way, a laminate of the backing layer, the FPC, the piezoelectric layer and the acoustic matching layer was prepared.

Subsequently, the laminate was subjected to dicing by a dicer having a thickness of 0.02 mm at a pitch of 0.2 mm from the side of the acoustic matching layer in the order of the acoustic matching layer, the piezoelectric layer and the FPC so that the backing layer was not completely cut, whereby the laminate was split into plural laminate pieces. Furthermore, the acoustic matching layer and the piezoelectric layer (the upper electrode and the piezoelectric body) of each diced laminate were further diced from the side of the acoustic matching layer by the dicer so that the laminate was divided equally into three and that the backing layer, and the FPC and the lower electrode of the piezoelectric layer were not cut.

(Coating)

Subsequently, a polychloroparaxylylene film having a thickness of 3 μm was formed on the surface of the diced laminate by using diX-C (manufactured by KISCO LTD., "diX" is the registered trademark of Daisan Kasei K. K.) as a raw material dimer by means of a film forming device (Labcoter PDS2010;).

(Filling)

Subsequently, the grooves formed by the dicing in the laminate were filled with a two-liquid type RTV rubber (KE-1600; manufactured by Shin-Etsu Chemical Co., Ltd.) in vacuum, and the rubber was cured. By this way, the respective laminate pieces were attached to one another.

(Acoustic Lens)

Subsequently, press molding was conducted by means of a manual molding machine (P500F-4141; manufactured by Shoji) at 165° C. for 10 minutes, instead of forming into a sheet form in the method for producing Sheet 3, and secondary vulcanization was further conducted at 200° C. for 2 hours, whereby an acoustic lens was prepared.

Finally, the prepared acoustic lens was disposed on the laminate in which the respective laminate pieces had been attached to one another, and fixed in vacuum by a two-liquid type RTV rubber (KE-1600; manufactured by Shin-Etsu Chemical Co., Ltd.), whereby Ultrasonic probe 1 was prepared.

(Ultrasonic Probes 2 to 5)

Ultrasonic probes 2 to 5 were each prepared in a similar manner to that for Ultrasonic probe 1, except that either of Sheets 8 to 11 was used instead of Sheet 3.

4. Evaluation of Ultrasonic Probe (1) Evaluation of Acoustic Property

For Ultrasonic probes 1 to 5, the sensitivity against ultrasonic waves and the specific band width (−6 dB) were respectively evaluated by an ultrasonic probe tester (First Call 2000; manufactured by Sonora Medical Systems). The sensitivity refers to a relative sensitivity based on Ultrasonic probe 4 (100%), and the case when the relative sensitivity was greater than 100% was judged to be acceptable. For the specific band width, the case when the specific band width was greater than 80% was judged to be acceptable.

(2) Evaluation of Ultrasonic Image

For each of Ultrasonic probes 1 to 5, an ultrasonic image was prepared by using an ultrasonic phantom model (RMI 404GS-LE; manufactured by GAMMEX). Each ultrasonic image was evaluated according to the following criteria.

◯: Multiple reflection was observed little, and the boundary was sharp.

x: Multiple reflection was observed, and the boundary was blurred.

For Ultrasonic probes 1 to 5, the number of the ultrasonic probe, the sheet number, the results of the evaluation of the acoustic properties (relative sensitivity and specific band width), the result of the evaluation of the ultrasonic image, and the classification are shown in Table 3.

TABLE 3

| Ultrasonic probe No. | Sheet No. | Relative sensitivity [%] | Specific band width [%] | Ultrasonic image | Classification |
|---|---|---|---|---|---|
| 1 | 3 | 108 | 87 | ◯ | Examples |
| 2 | 8 | 105 | 85 | ◯ | |
| 3 | 9 | 110 | 88 | ◯ | |
| 4 | 10 | 100 | 78 | X | Comparative Examples |
| 5 | 11 | 101 | 79 | X | |

As shown in Table 2, Sheets 1 to 9 according to Examples were excellent in attenuation rate, chemical stability (discoloration) and physical strength (rubber hardness and abrasion property). The cause thereof can be considered that Sheets 1 to 9 were each constituted by a vulcanization-molded article of a rubber composition containing a first silicone rubber composition having a plasticity number of 100 or less and a second silicone rubber composition having a plasticity number of 150 or more and 300 or less.

As shown in Table 3, Ultrasonic probes 1 to 3 according to Examples were excellent in sensitivity against ultrasonic waves, specific band width and ultrasonic image. The cause thereof can be considered that Ultrasonic probes 1 to 3 each had an acoustic lens constituted by a vulcanization-molded article of a rubber composition containing a first silicone rubber composition having a plasticity number of 100 or less and a second silicone rubber composition having a plasticity number of 150 or more and 300 or less.

On the other hand, as shown in Table 2, Sheets 10 to 15 according to Comparative Examples were poor in at least either of the attenuation rate, the chemical stability and the physical strength. The cause thereof can be considered that Sheets 10 to 15 were not constituted by the vulcanization-molded article. Specifically since a butadiene rubber was used instead of silicone rubber compositions in Sheet 11, Sheet 11 was poor in chemical stability.

Furthermore, as shown in Table 3, Ultrasonic probes 4 and 5 according to Comparative Examples were poor in at least either of the sensitivity against ultrasonic waves, the specific bandwidth and the ultrasonic image. The cause thereof can be considered that Ultrasonic probes 4 and 5 did not have an acoustic lens constituted by the vulcanization-molded article.

According to an embodiment of the present invention, an acoustic lens in which attenuation of ultrasonic waves is low, and which is excellent in both chemical stability and physical strength can be provided. Therefore, according to an embodiment of the present invention, further popularization of ultrasonic probes and ultrasonic imaging devices is expected.

Although the present invention has been described and illustrated in detail, it is clearly understood that the same is by way of illustrated and example only and is not to be taken byway of limitation, the scope of the present invention being interpreted by terms of the appended claims.

What is claimed is:

1. An acoustic lens for an ultrasonic probe, comprising a vulcanization-molded article of a rubber composition including a first silicone rubber composition having a plasticity number of 100 or less, and a second silicone rubber composition having a plasticity number of 150 or more and 300 or less.

2. The acoustic lens according to claim 1, wherein the acoustic lens has a specific gravity of 1.2 or more and 1.6 or less.

3. The acoustic lens according to claim 1, further comprising inorganic particles having a specific gravity of 3 or more and less than 7.

4. The acoustic lens according to claim 3, wherein the inorganic particles have a number average particle size of 0.05 µm or more and 0.5 µm or less.

5. An ultrasonic probe comprising the acoustic lens according to claim 1.

6. An ultrasonic imaging device comprising the ultrasonic probe according to claim 5.

7. A method for producing an acoustic lens for an ultrasonic probe, comprising the steps of:
preparing a rubber composition by kneading a first silicone rubber composition having a plasticity number of 100 or less and a second silicone rubber composition having a plasticity number of 150 or more and 300 or less; and
subjecting the rubber composition to vulcanization molding.

8. The method for producing an acoustic lens according to claim 7, wherein the step of preparing the rubber composition is a step of kneading the first silicone rubber composition, the second silicone rubber composition, and inorganic particles having a specific gravity of 3 or more and less than 7.

9. The method for producing an acoustic lens according to claim 8, wherein inorganic particles having a number average particle size of 0.05 µm or more and 0.5 µm or less are used as the inorganic particles.

* * * * *